July 23, 1957    L. J. CANNON    2,800,385
INK FEED APPARATUS
Filed Jan. 23, 1953    3 Sheets-Sheet 1

INVENTOR
Lloyd J. Cannon

BY *Francis D. Ammen*

ATTORNEY

July 23, 1957

L. J. CANNON 2,800,385

INK FEED APPARATUS

Filed Jan. 23, 1953

INVENTOR
Lloyd J. Cannon

BY

ATTORNEY

July 23, 1957     L. J. CANNON     2,800,385
INK FEED APPARATUS

Filed Jan. 23, 1953     3 Sheets-Sheet 3

INVENTOR
Lloyd J. Cannon

BY

ATTORNEY

United States Patent Office 2,800,385
Patented July 23, 1957

2,800,385

INK FEED APPARATUS

Lloyd J. Cannon, El Segundo, Calif.

Application January 23, 1953, Serial No. 332,965

2 Claims. (Cl. 346—140)

This invention relates to apparatus for recording values of any variables incidental to the operation of industrial plants, such as pressure, temperatures, or other information that is to be indicated and recorded.

The present application is one that is continuing in part as to the disclosures in my prior application titled Ink Feed Apparatus, filed on the 29th day of September 1949, Serial No. 118,493, now abandoned.

In recording apparatus of the type to which these inventions relate, the recording lines upon the chart are usually made upon a disc-form chart of the rotary type, and the disc revolves at a uniform speed, usually making one complete revolution every twenty-four hours.

In another type of chart recording apparatus the record is taken upon a continuously driven paper web advancing at a uniform speed.

In both these types of recording instruments it is frequently required to record several variables simultaneously on the same chart, and this in practice, makes it advisable to mount the recording pen-arms which carry the recording pens, upon a common axis. It is also a fact that when two or more pens are making records simultaneously on the same chart, the record lines sometimes, indeed, frequently cross each other. It is sometimes necessary to use a different distinctive color for each pen to insure a clear legibility and accuracy in the reading and interpretation of the recordings.

Until recently recording pens employed in practice, in recording instruments such as referred to above, have consisted of a small V-shaped trough pointed at the writing end or various shapes of cups with small tubes feeding ink to the chart. These cups or troughs were necessarily of small capacity and required frequent filling by means of droppers. The larger these swinging reservoirs were, the more the wright variation interfered with the accuracy of the meter or recording instrument.

As the cups referred to are usually open to the atmosphere and often are operated in locations where the ink can become thickened by the presence of dust, the instruments employing them require quite constant attention.

One of the objects of this invention is to provide recording instruments such as described with a recording pen and ink feeding apparatus for the same that will insure a constant and uniform supply of ink to the pen point, and operating to maintain the ink supply flowing to the pen point in such a way that the ink is actually wiped off the tip of the pen by the passing surface of the chart. In other words, it is an object to provide a pen that will place enough ink on the chart to wet its surface; and to provide a control for the flow of the ink which will enable the pen to operate in such a way that if a blot of ink were encountered by the pen on the surface of the chart, it would be drawn in, or sucked back into the ink bottle. This is accomplished by maintaining the ink reservoir slightly below the pen point.

In fact this operation was demonstrated at the exhibit of the Southern California Meter Association which occurred on November 20 to 22, inclusive in the year 1952.

These effects are accomplished through the assistance of capillary attraction, resulting from using a pen operating so that the ink at the pen tips is to say held in a balanced or neutral state, that is, it is not biased to flow out of the pen tips but is held by the tip's bore so that it presents the lower end of the descending column of the siphon at a point in line with the plane in which the outlet from the pen tip lies.

It frequently happens in the operation of chart recording when using a plurality of pens, that they will oscillate back and forth with so little time between the successive oscillations that successive strokes of the pen will lay a line in contact with a line just scribed by the same pen; it also may happen that one of the pens will cross an ink line just drawn by an adjacent pen. One of the objects of this invention is to provide a pen feed which under such circumstances will operate without flooding the chart; and to produce a pen that will operate to cross a scribed line just made by an adjoining pen without producing any blot on the chart by reason of confluence of its ink with the fresh ink just laid on the chart by the other pen.

In a multiple recording instrument the pens are mounted for rotation about a common axis that is located at a higher level than the pen tips, and employing a feed duct of siphon type for each pen. And one of the objects of the invention is to provide an ascending leg for the siphon having characteristics that will insure that it will have negligible effects in either opposing or enhancing the swinging movements of the pen arm; and also having qualities that will facilitate the use of a method I employ for effecting changes in the capillary characteristics of either or both legs of the siphon.

Another object of the invention is to construct a pen and feed apparatus so that the entire duct can be readily cleaned; also, to provide a duct having a form minimizing the number of points where air pockets could develop in the feed line.

Further objects of the invention will be evident from a careful reading of this specification and study of the drawing accompanying this application.

As regards the apparatus the invention consists in the novel organization and cooperation of the elements as described herein.

As regards the method, the invention consists in the procedure to be described hereinafter for regulating the capillary characteristics and performance of the apparatus.

In the drawing:

Fig. 1 is a front elevation of a recording instrument illustrating my invention applied to the same. This view is of diagrammatic nature, and portions of the chart and the face plate of the instrument are broken away so as to disclose my apparatus mounted in position to cooperate with such an instrument. This view illustrates a type of instrument employing two pen arms, and capable of producing two record lines simultaneously, each of which correponds to a different function; for example, one may register pressures, and the other may represent temperatures, or any other function or condition.

Figure 1:
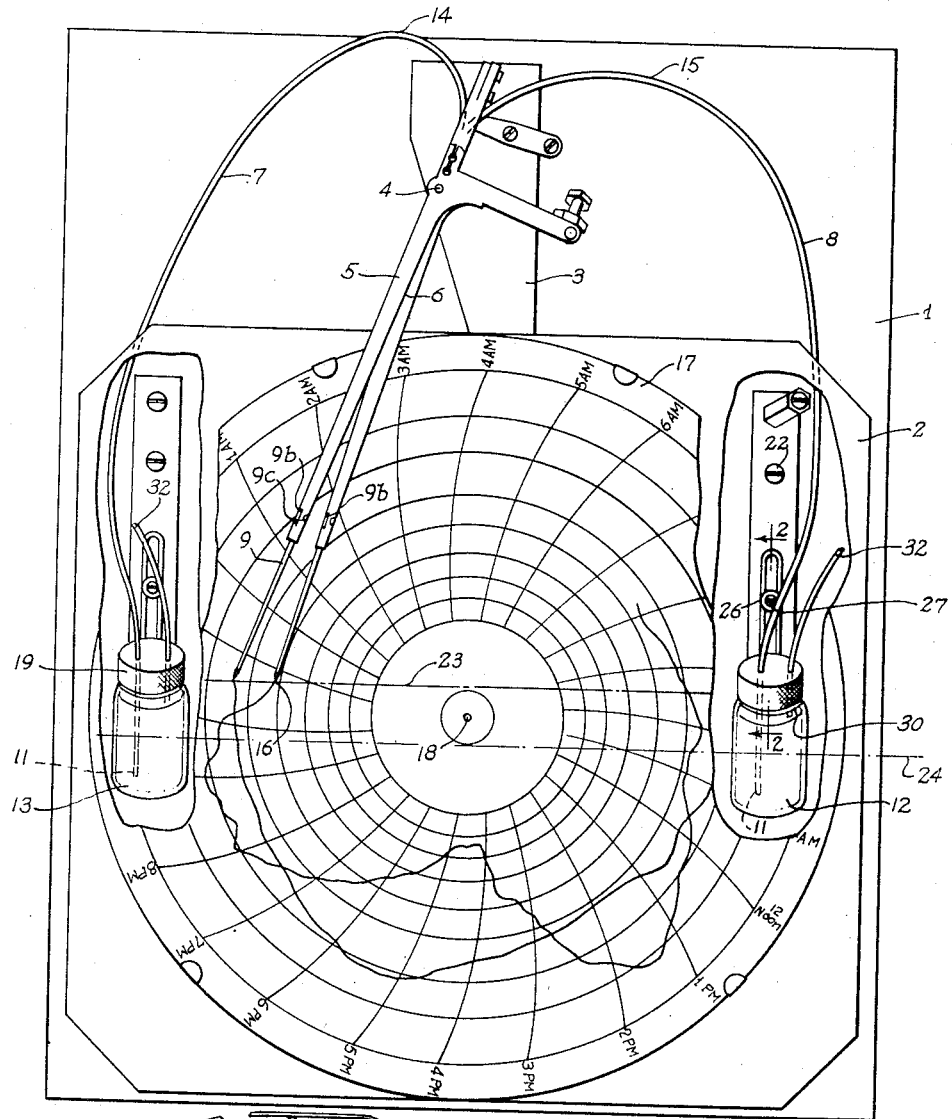

Referring more particularly to the parts, the instrument illustrated includes a back board 1, and a face plate 2 that is supported by the back board spaced a suitable distance from the back board. The back board is adapted to be attached to the face of a wall or any other suitable support, so as to hold the face plate 2 in a substantially vertical plane. On the back board a base plate 3 is mounted, that carries a pivotal support 4 for two pen arms 5 and 6. These pen arms are formed of thin flexible metal and carry light flexible tubes such as tubes 7 and 8. These tubes are of minute cross-section, and are preferably formed of resinite, or a similar plastic or composition that is resistant to the action of ink. They are connected to their arms so that they do not interfere with the free movement of the arms on their pivots, such as pivot 4. The portion of each flexible tube that is disposed on its corresponding arm, is telescoped at its delivery end to a straight tubular pen 9 or 10, and this portion of the tube constitutes means for supporting the descending column of ink, that is to say, the bore at the outlet is capillary. That is to say, the orifice or bore in each tip is minute. The ascending column for the ink is carried in the outer portion of the flexible tubes, and each of these tubes has its mouth 11 disposed in one of the ink receptacles or holders 12 or 13 that carry the ink.

The upper portions of the two flexible tubes have elevated "peaks" or bights 14 and 15 which divide the two columns of the siphon into the ascending column and the descending column. Each pen, such as the pen 9 in Fig. 2, has a laterally bent tip 16 that travels on the surface of the card or chart 17, which chart is mounted for rotation in the instrument about its central axis located at 18.

The tubes 7 and 8 pass downwardly through caps that may be screw caps 19 as illustrated, that close the upper ends of the holders 12 and 13 so that the inlet mouth 11 of each tube is located below the level of the ink in its corresponding holder.

Each holder is usually supported on the rear side of the face plate 2, and the means for supporting these holders is the same for each holder.

The means for supporting each holder includes a vertical elongated frame plate or bracket plate 20, the upper end of which is supported by a post 21 mounted on the rear side of the face plate 2. This plate 20 is in the form of a flat bar, the upper end of which may be provided with one or more openings such as the opening 22 to adapt it for mounting in instruments of different dimensions or construction. These holes 22 also adapt the bracket plate 20 to be supported on fasteners at different levels. This makes the holder adaptable to different specific situations or environments where the holder must be mounted.

The holders 12 should be supported so that they are located slightly below the level at which the points 16 of the pens are located. This level is indicated in Fig. 1 by the dotted line 23. The level of the ink in each holder is indicated by the dotted line 24, and the level of the ink should be a short distance below the level at which the pen points 16 are normally located, that is to say, a sufficient distance to enable the capillary attraction to raise the ink from the surface level at 24 to the level of the line 23. This location for the holders operates to effect a substantial balance between the ascending and descending columns of ink in the siphon tubes, so that due to the capillary attraction that may be present in the ascending leg, and is always present in the pen tips, the ink is raised from the level 24 to the level 23, and as ink is wiped off the pen tip by the passing chart surface, an equal amount of ink is replenished, passing up into the siphon through the inlet mouth due to the capillary action. When the chart is not rotating the flow of ink at the pen ceases because the pen is at the lower end of the short leg of the siphon.

In order to enable the level of the ink holders to be nicely regulated, I prefer to support each holder on a bifurcated bracket 25 made of bent wire, so that it presents two forks which may be clamped against the inner face of the carrier plate 20 by means of a washer 26 and a bolt 27 that passes through the washer from the inside, and carries a nut 28 that can be tightened up to clamp these parts securely together.

At the lower end of the bifurcated bracket 25 the two forks that form it, are united together by a twist 29, and the ends of the wires beyond the twist are bent around to form two prongs 30 that cooperate to form a split yoke that can be sprung around the reduced neck 31 of each holder.

In addition to the tubes 7 and 8, I provide each srrew cap 19 with a short tube 32 that extends down through it with its lower end terminating in the air space of the holder. By blowing into the upper end of this tube 32, the pressure of the air in each holder under its cap 19, can be slightly raised, the effect of which will be to fill the siphon tube with the ink. As soon as the ink appears at the points of the pens the blowing is discontinued. This constitutes an easy way for establishing the siphon.

In order to enable each pen tube 9 to maintain itself in its arm without becoming oriented on its own longitudinal axis, each pen is provided with a metal fin 9a. These pens 9 are disconnectibly secured in their arms 5 and 6, respectively, by means of a small clip 9b. One of these clips is shown in detail in Fig. 3. It consists of a small plate of thin metal to the under side of which the tubular body of the pen is soldered. The clip has a small inturned flange 9c at one edge that hooks over an edge of the arm. After this hook flange is applied to the edge of the arm, the opposite edge, that projects slightly beyond the other side of the arm is bent up over it to form a retaining tongue 9d.

Figure 4:
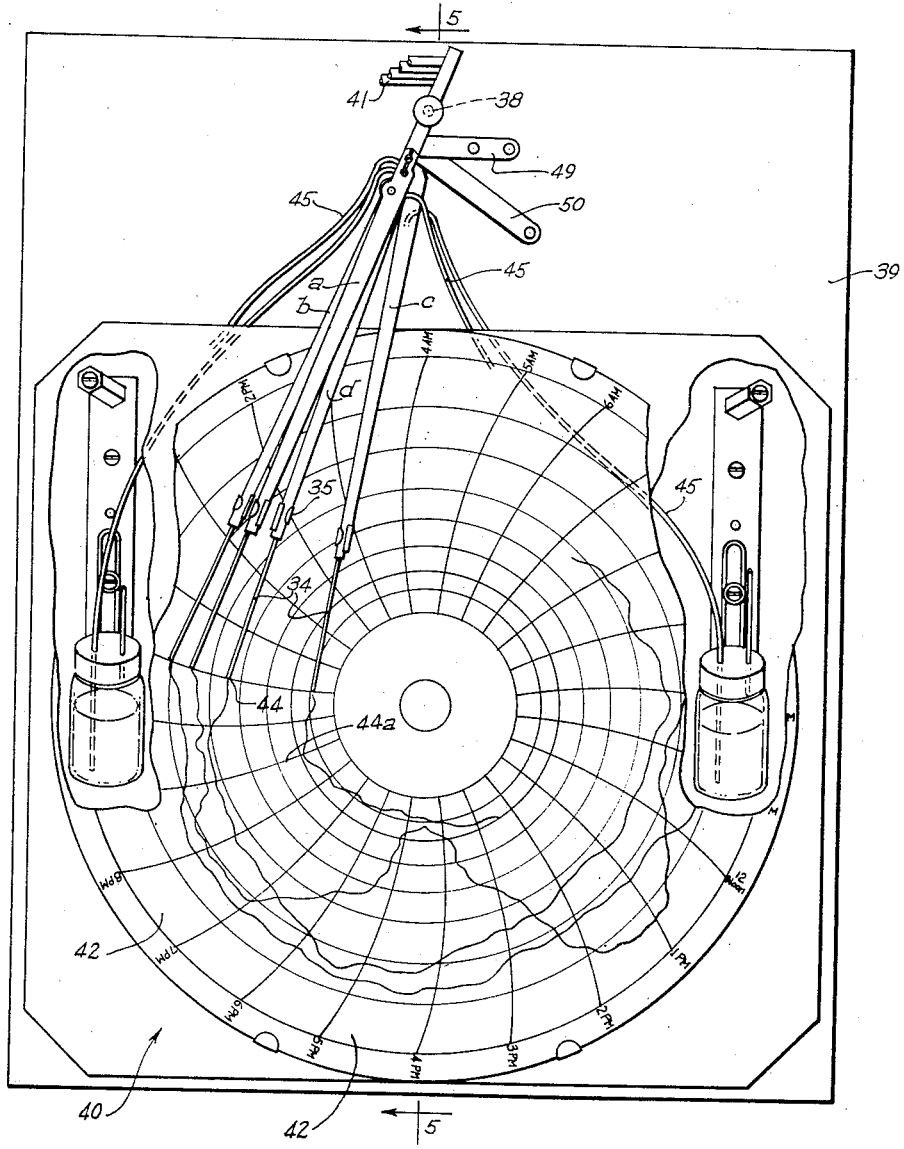
Fig. 4 is a view similar to Fig. 1, illustrating four pen arms and pens describing lines which are functions of variables, for example, temperature, pressures, specific gravity or any other variables, the variations of which must be recorded.

In Figure 4, I illustrate an embodiment of the invention in which four pen arms a, b, c and d, are employed, with pens 33 carried respectively thereby mounted on a common axis of oscillation.

To the edge faces of these arms the tubular pen bodies 34 are secured by clips 35. These arms have substantially parallel shanks 36 with radial extensions 36a extending from sleeves 37 that are mounted in tandem arrangement on a common spindle or arbor 38 attached to the base-board 39 of the recording instrument 40.

Each shank is connected to a member such as a pivotally attached link 41, the movements of which are controlled by a corresponding variable element or the state of some material that must be recorded on the chart 42.

The tips 43 of the pens a, b, c and d, preferably have minute capillary bores, the outlets of which rest flat against the face of the chart and are substantially closed by its surface. The arms a, b, c and d and their shanks are composed of sufficiently resilient material to insure that the points 44 of the tips of the pens will bear with slight and yielding pressure against the surface of the chart.

The points 44 of the tips are disposed quite close together so that they can scribe their lines simultaneously along the same time arcs such as the time arcs 44a indicated on the chart. These arcs 44a, of course, are all struck on a radius substantially equal to the average of the radial distance from the axis of the arbor 38 to the pen points 43.

It is of great advantage in practice to have the points 44 of the pens track extremely close together, as it enables a single chart to record related variable things occurring simultaneously, at the same instant. This avoids the necessity for preparing combined record graphs of different variables on a reconstructed chart if it is desired to show graphically the relation of different variables to each other at the same moment.

In an instrument such as illustrated in Fig. 4, it is most desirable to employ ascending siphon legs or ducts of a character that will insure that they will not touch each other as the pens oscillate, as this would seriously interfere with the accuracy of the recording. It is also desirable to provide ducts having characteristics that enable the capillary capacities of the ducts to be regulated to adapt the same to special conditions such as may affect the character of the graph being made by the pen, for example, a pen may be forced to oscillate at a relatively high rate, in which case it must have an ascending siphon leg capable of supplying its ink at a relatively high rate. In another case it may be necessary to increase the capillary characteristic of the duct of a certain pen in recording.

For this purpose I employ ducts 45 for the ascending legs of the siphons, of a material having a minute bore, that is to say, a material that has a relatively high elastic limit, that is to say, highly stretchable without rupturing or parting.

After considerable experimenting I have discovered that a material having the characteristics of Vinylite, a resin plastic, can be readily stretched with one's hands beyond its elastic limit, whereupon its capillary characteristics become greatly increased.

This material is also of extremely light weight, in fact, it is so light that when attached to the upper end of a tubular pen the weight of its material between the point of attachment to the pen and the ink receptacle, is so insignificant as not to affect the accuracy of a previous calibration of the pen arm that carries it.

Furthermore, a tube of this material is sufficiently translucent to enable air bubbles to be readily discernible within it. Such air bubbles of course interfere with continuous recording of a graph by the corresponding pen, and must be eliminated.

This material for the ducts that I employ is also flimsy and hangs limp; consequently the movements of the pen to which it is attached can develop no resistance in the tube to such movement.

Figure 6:
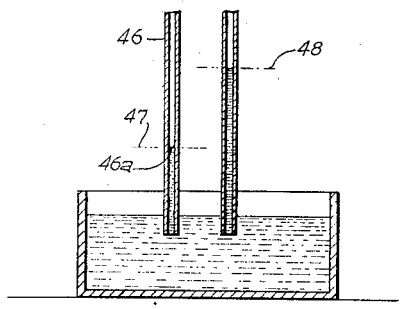
Fig. 6 is a diagrammatic view illustrating the effect of stretching one of the ascending legs of the siphon to control its capillary characteristics.
Figure 7:
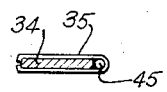
Fig. 7 is a section through one of the pen-arms looking toward one of the clips.

Fig. 6 of the drawing illustrates the effect on the capillarity of this kind of ascending leg of the siphon by stretching it. In that figure the piece of tubing 46 at the left might have the meniscus 46a of its contained liquid column at the level 47; if a permanent set has been established in the material of its wall the meniscus may be raised to the level of the line 48. The level at which this meniscus would be held by such a tube with respect to the level of the pen tip is of course an important factor in the freedom of flow of the ink to the pen point.

In Figs. 1 and 4, arms 49 and 50 are illustrated that project laterally from them. These arms function as counterbalances for the turning moment developed by the shifting of the center of gravity of the arm during the outward stroke of their corresponding pen arms.

Referring again to the embodiment of the invention shown in Fig. 1, it should be stated that the use of a single flexible bow between the reservoir and the pen tube is most advantageous in minimizing the effect of changes of temperature on the accuracy of the recording, as compared with prior suggested constructions in which the upper end of a tubular recording pen is attached to a helix formed in the tubing.

Figure 2:
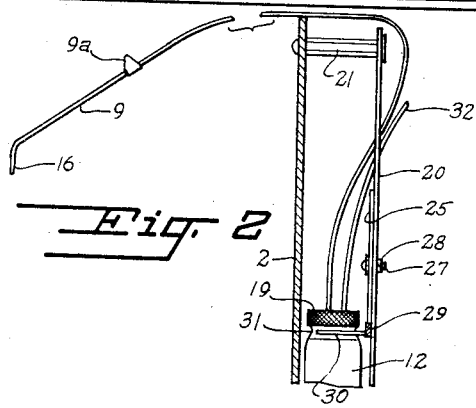
Fig. 2 is a fragmentary view, and is substantially a vertical section upon a reduced scale taken about on the line 2—2 of Fig. 1. Though upon a reduced scale, it further illustrates the means for supporting the ink holder, together with the flexible tubes that I employ, associated with the same and with the pen.
Figure 3:
Fig. 3 is a section through a pen arm and showing the manner in which the tubular pen is attached to it by means of a clip.
Figure 5:
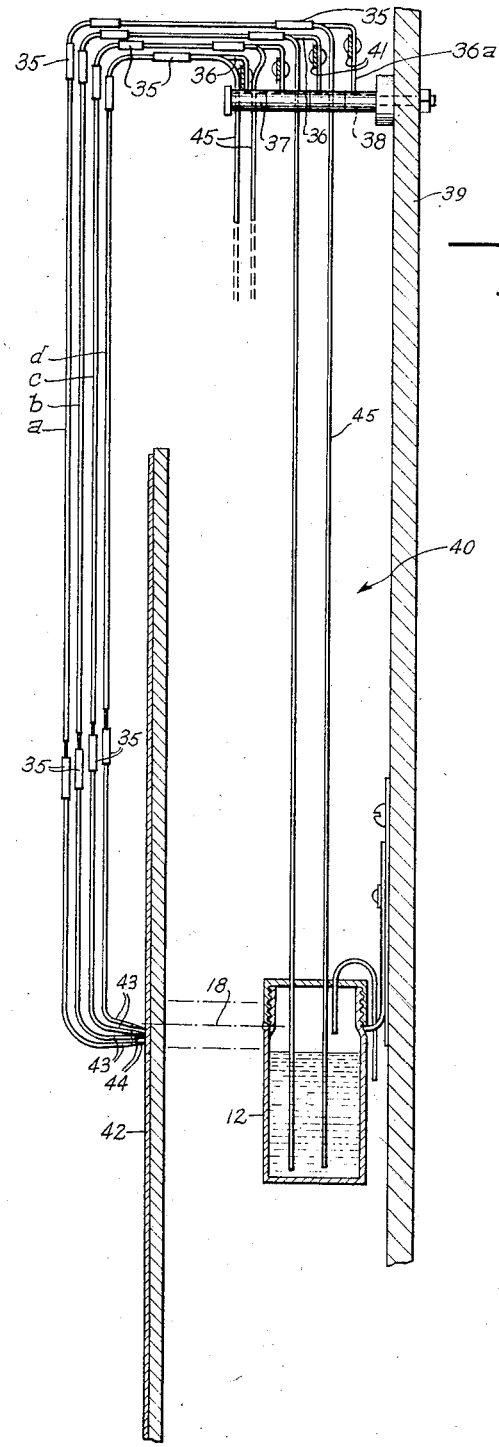
Fig. 5 is a vertical section taken about on the line 5—5 of Fig. 4 illustrating a multiple pen type of recording apparatus. This view is upon a larger scale than Fig. 1, and is an ideal section, that is to say, although the fluid container shown on the left of Fig. 4 is shown in vertical section it actually is not located on the line 5—5.

In the embodiment of the invention illustrated in Figures 1 to 3 inclusive, the tubular bodies of the pens are illustrated as secured to the flat faces of the pen-arms 5 and 6 by means of flat clips or fins 9a carried by the pen bodies respectively. But in an instrument carrying a greater number of pens for example 4 pens, it is desirable to insure that the flexible flimsy tubes or ducts 45 will not interfere with each other during the movements of the pen-arms a, b, c and d; and to accomplish this, I prefer to secure the pen bodies 34 on the edges of the pen-arms by means of small metal clips 35 as indicated in Figures 4 and 5; and these clips 35 are also used to secure horizontal portions of the ducts 45 to the shanks 36 that connect to the radial extensions 36a that are attached to the controlling links 41, see Figure 5.

The ascending leg from each ink reservoir is suspended from properly placed clips 35 that hold the ascending legs of the syphon so as to hang down between the radial extensions 36a. These ascending legs may be hung across the sleeves 37, so that they extend from there in the direction of the reservoirs from which they conduct the ink.

Many other embodiments of the invention may be resorted to without departing from the spirit of the invention.

I claim as my invention and desire to secure by Letters Patent:

1. In a recording instrument including a pen having an arm portion and a writing end, a support therefor, said pen having a capillary bore therein at its writing end, an ink container, a stretchable, non-elastic, flexible, tubular conduit connected at one end to the pen arm and at the other end extending into the ink container, said ink container being positioned with the ink level below the writing point of the pen in operation, said conduit being supported to provide a syphon between the pen and the ink container with the long leg of the syphon tending normally to flow in the direction of the container, said conduit having a dimension greater than the capillary bore at the writing end of the pen, providing capillary attraction for the ink and the ink being supplied to the pen by said capillary action of the conduit and the pen, said conduit being translucent throughout its length to permit inspection of the flow in the conduit for detecting obstructions therein and being compressible to permit removal of such obstructions by pressure on the conduit, said fluid in the conduit being maintained at a balance between the capillary attraction and the syphon to furnish a flow of ink for the pen when engaged with a surface, and said syphon functioning to hold back the flow of ink when the pen is removed from said surface.

2. In a recording instrument including a pen having an arm portion and a support therefor, said pen having a capillary bore therein, an ink container, a flexible, non-elastic, transparent tube connecting the pen and the ink container, said tube having a capillary bore therein and being arranged between the pen and the ink container in the form of a syphon, with the long leg of the syphon extending into the ink container, said ink container being arranged below the level of the discharge point of the pen, whereby the syphonic action is in the direction of the ink container and the capillary feed is in the direction of the pen, said tube being stretchable to modify the capillary action of the bore to maintain a balance between the capillary feed and the syphonic action for holding the flow of ink in the bore with an available pressure for delivering the flow of ink from the pen on contact of the pen with the recording surface.

References Cited in the file of this patent

UNITED STATES PATENTS

| | | |
|---|---|---|
| 1,907,096 | Angus | May 2, 1933 |
| 2,137,592 | Shepard | Nov. 22, 1938 |
| 2,176,777 | Tate | Oct. 17, 1939 |
| 2,392,487 | Lee | Jan. 8, 1946 |
| 2,646,336 | Edinburg | July 21, 1953 |